Dec. 12, 1944.   M. L. MOREMEN   2,365,144
AUTOMATIC OVERLEAD GUNSIGHT
Filed Dec. 21, 1942   9 Sheets-Sheet 1
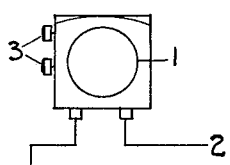
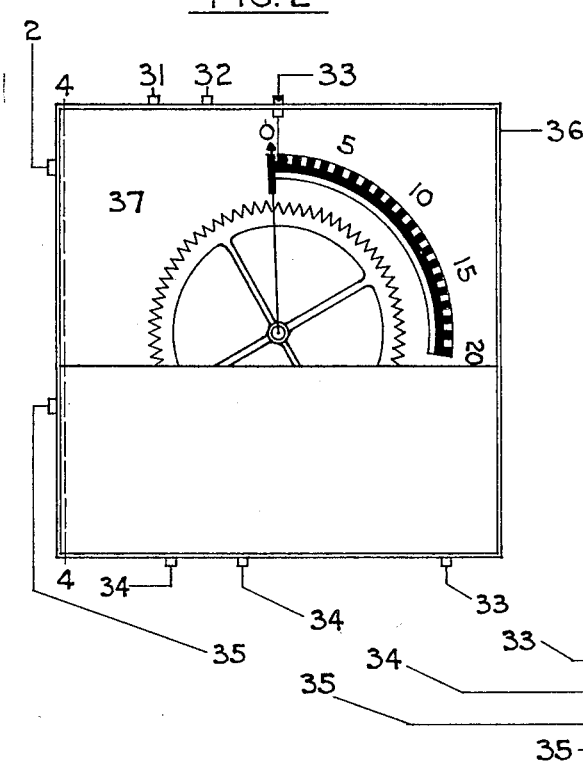
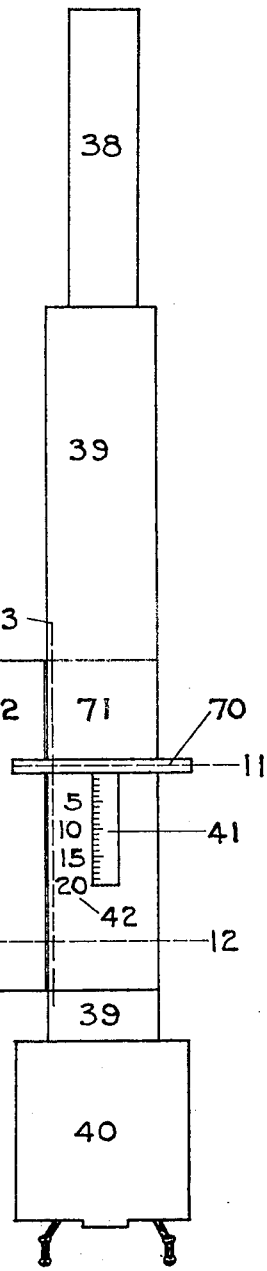
Witnesses:
Elsie G. Griffin
Lela May Jennings
Inventor:
Marcus Lipscomb Moremen

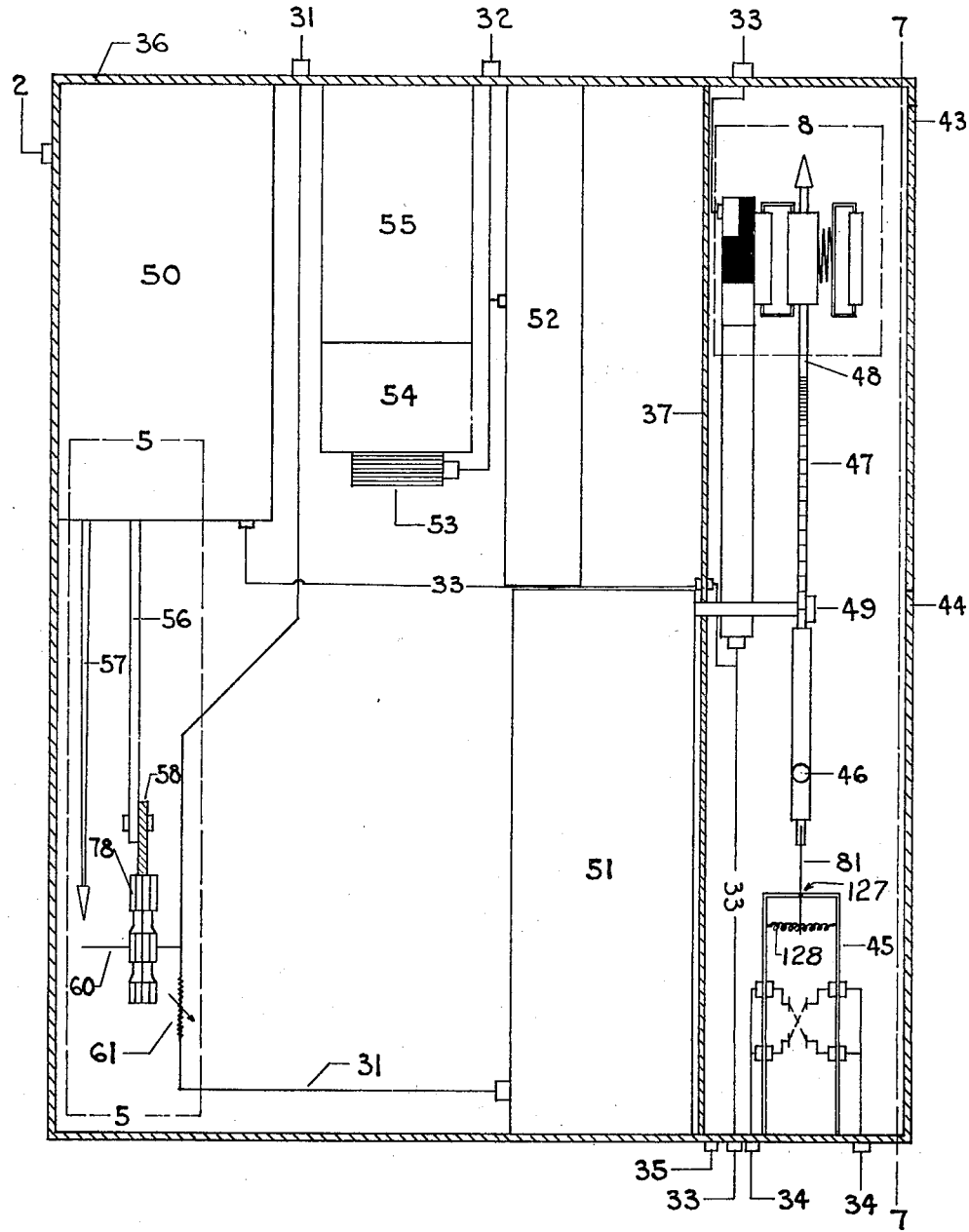

Dec. 12, 1944.   M. L. MOREMEN   2,365,144
AUTOMATIC OVERLEAD GUNSIGHT
Filed Dec. 21, 1942   9 Sheets-Sheet 3
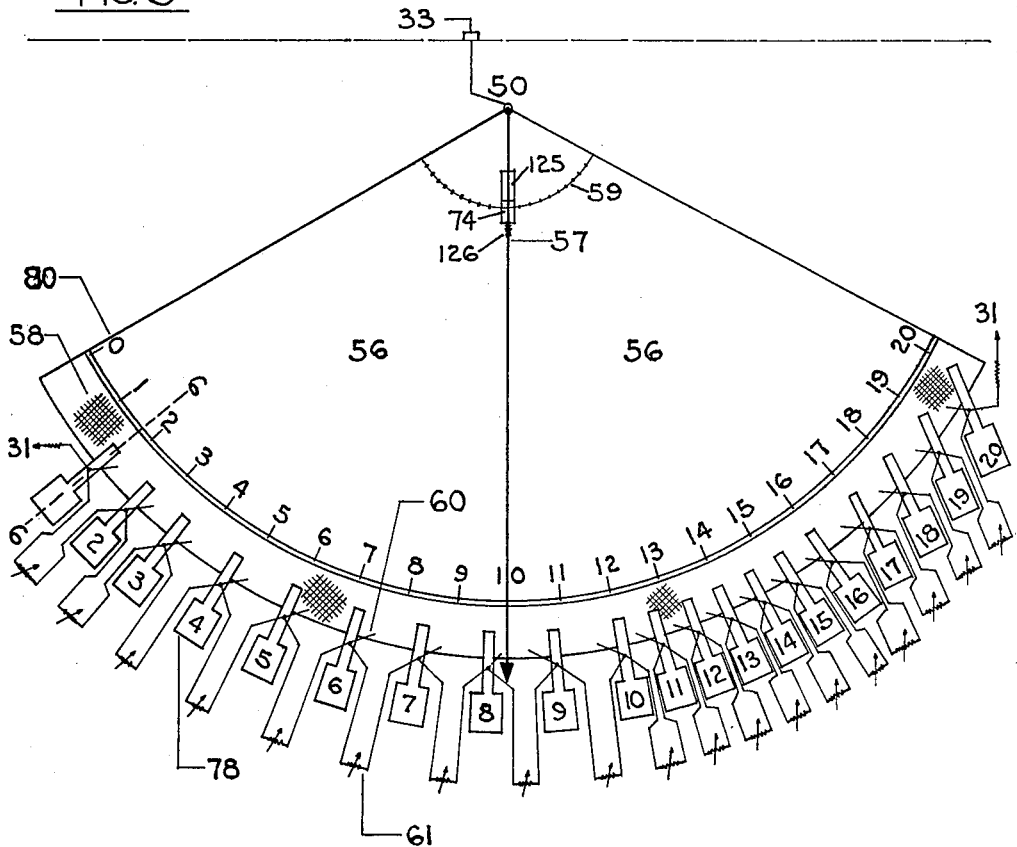
FIG. 5
FIG. 6
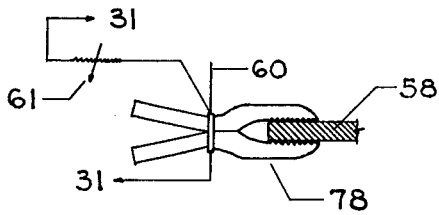
Witnesses:
Elsie B. Griffin
Lela May Jennings
Inventor:
Marcus Lipscomb Moremen Dec. 12, 1944.    M. L. MOREMEN    2,365,144
AUTOMATIC OVERLEAD GUNSIGHT
Filed Dec. 21, 1942    9 Sheets-Sheet 4

Inventor:
Marcus Lipscomb Moremen

Dec. 12, 1944.  M. L. MOREMEN  2,365,144
AUTOMATIC OVERLEAD GUNSIGHT
Filed Dec. 21, 1942  9 Sheets-Sheet 5

Inventor:
Marcus Lipscomb Moremen

Dec. 12, 1944.    M. L. MOREMEN    2,365,144
AUTOMATIC OVERLEAD GUNSIGHT
Filed Dec. 21, 1942    9 Sheets-Sheet 6
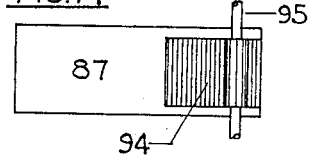
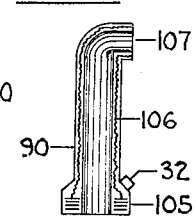
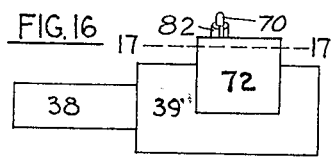
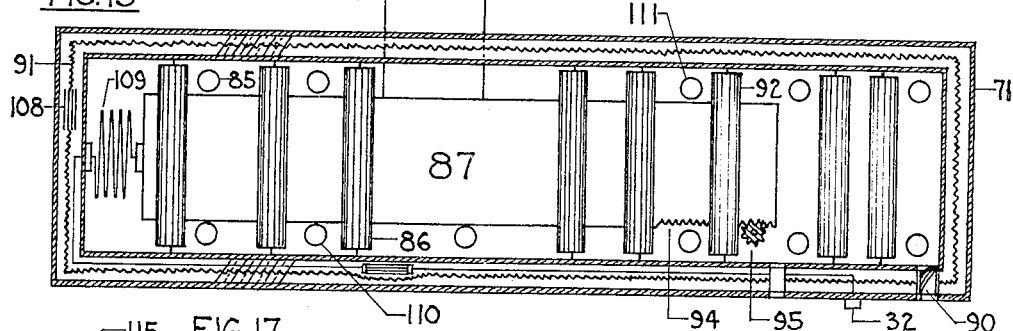
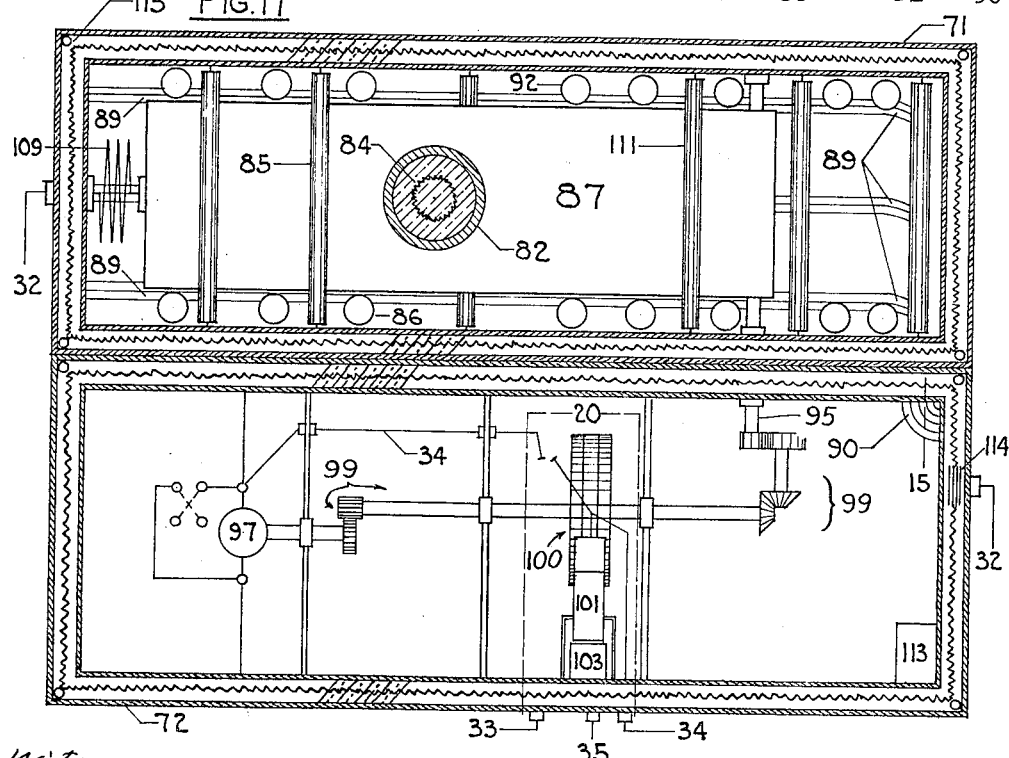
Witnesses:
Elsie G. Griffin
Lela May Jennings
Inventor:
Marcus Lipscomb Moremen Dec. 12, 1944.  M. L. MOREMEN  2,365,144
AUTOMATIC OVERLEAD GUNSIGHT
Filed Dec. 21, 1942  9 Sheets-Sheet 7
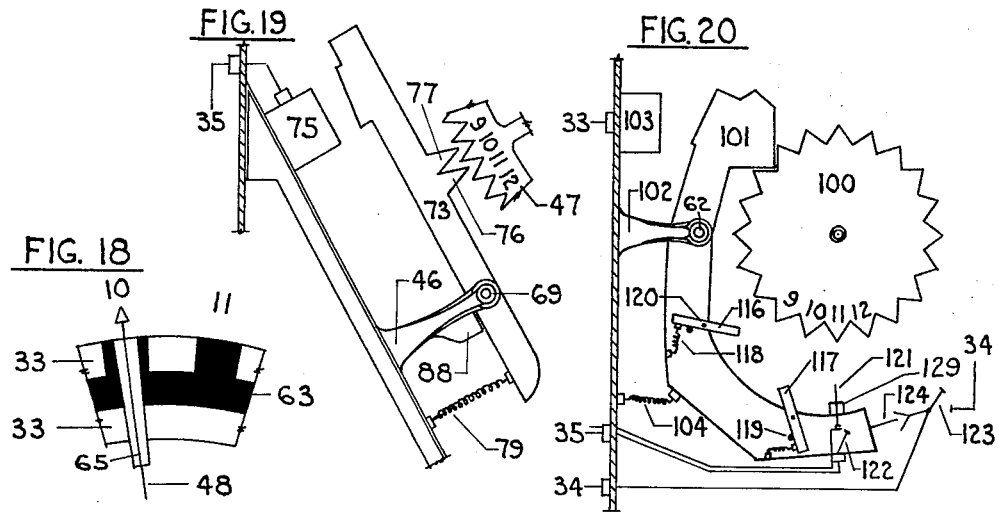
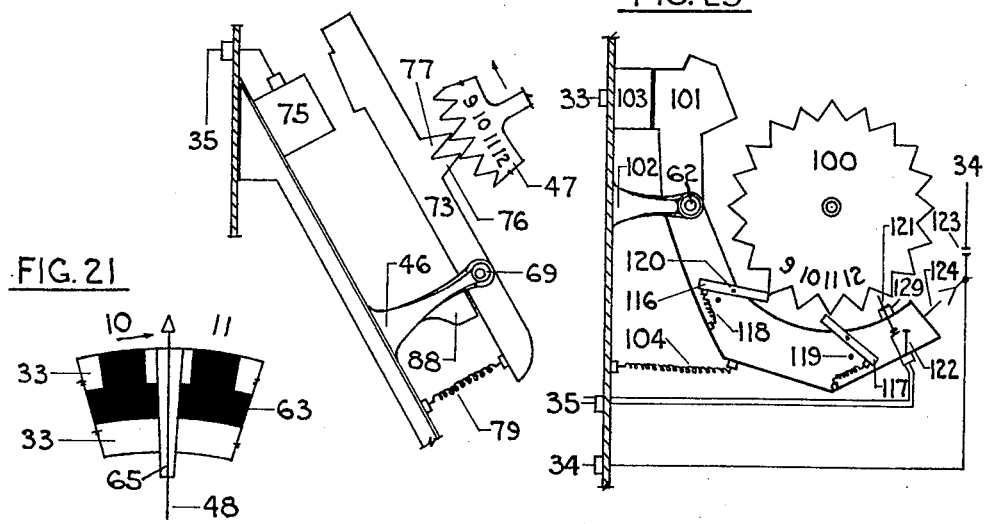

Dec. 12, 1944.  M. L. MOREMEN  2,365,144
AUTOMATIC OVERLEAD GUNSIGHT
Filed Dec. 21, 1942  9 Sheets-Sheet 8
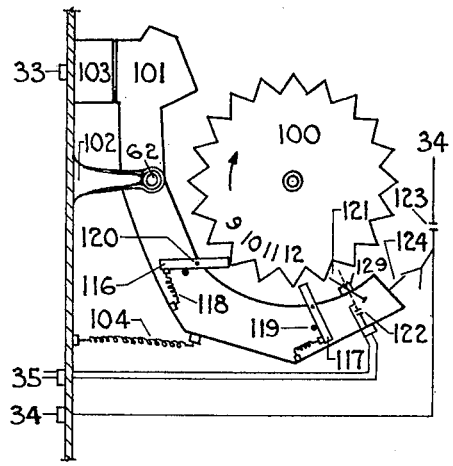
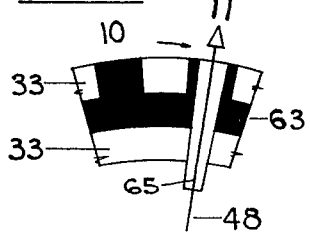
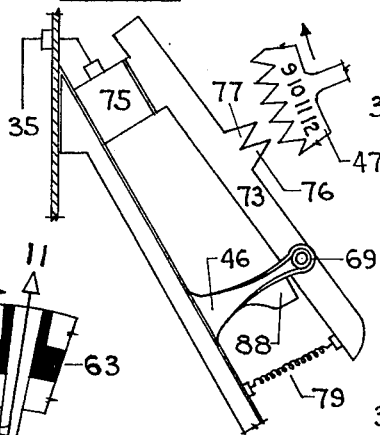
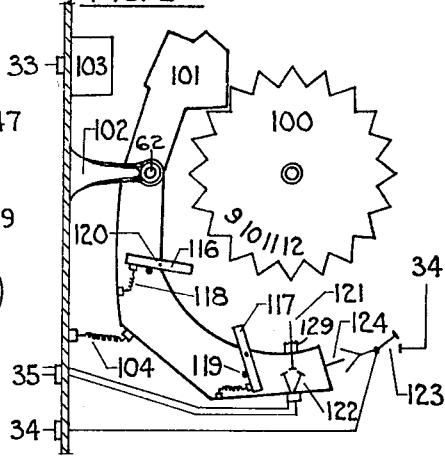
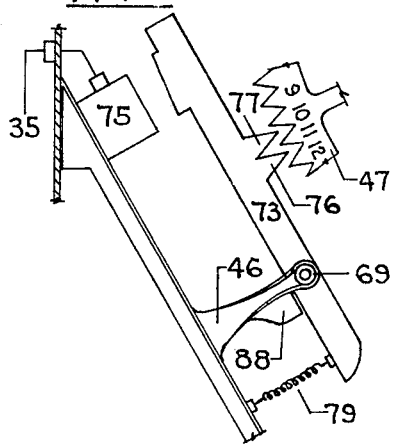
Inventor:
Marcus Lipscomb Moremen Patented Dec. 12, 1944

2,365,144

UNITED STATES PATENT OFFICE 2,365,144

AUTOMATIC OVERLEAD GUN SIGHT

Marcus Lipscomb Moremen, Jacksonville, Fla., assignor of one-tenth to John M. Mason, Washington, D. C.

Application December 21, 1942, Serial No. 469,639

12 Claims. (Cl. 33—49)

This invention relates to an addition to the rear gun sight such as is now used on machine guns, rapid fire guns and small fire guns, used in aerial gunnery and in anti-aircraft gunnery, and particularly to an improvement in the taking of aiming lead, during periods of dim light, such as is experienced at dawn, twilight, and during fog, moonlight, starlight, such conditions affording poor visibility of targets.

An object of the invention is to provide an assemblage or combination of instruments which during their operation automatically "sets off" that amount of aiming overlead needed to properly enable the gunner to aim the gun on the target on all conditions of light intensity which may affect the eyes of that individual gunner in relation to targets moving transversely to line of sight.

A further object of the invention is to provide mechanical means automatically controlled for "setting off" the aiming overlead which is affected by movement of the rear gunsight, a distance which is closer or further away from the eyes of the gunner.

The invention further has as its object the provision of means for determining what amount of aiming overlead is correct for the eyes of a particular gunner at different light intensities, and means whereby upon proper mechanical adjustment in accordance with the eyes of an individual gunner the gun can be aimed correctly by that gunner during different light intensities, and particularly when the light intensity is changing such as at dawn or twilight.

Other objects of the invention will be apparent from an inspection of the specification.

In the drawings:

Figures 1, 2 and 3 disclose diagrammatically and in elevation the electric eye, the overlead indicator and the gun sight assembly.

Figure 4 is a side elevation showing in greater detail, but diagrammatically, the overlead indicator shown in Figure 2, taken along the line 4—4 of Figure 2.

Figure 5 is a detail view of the dial face of the overlead indicator.

Figure 6 is a detail of one of the ratchet clips shown in Figure 5.

Figure 13 is a view partly in cross section of a ring type rear gun sight taken on line 13—13 of Figure 3.

Figure 14 is a plan view of the bottom of the slide bar of the rear gun sight.

Figure 15 is a cross sectional view of the drainage water pipe.

Figure 16 is a side plan view of the ring type sight 11 and the gun sight mechanism housing 72, in relation to the gun barrel 38 and the gun mechanism housing 39.

Figure 17 is a horizontal sectional view taken on the line 17—17 of Figure 16.

Figure 18 is a plan view of a segment of the overlead indicator face with the pointer and its roller resting upon an insulating portion thereof.

Figure 19 is a side elevational view of the ratchet sub-assembly.

Figure 20 is a side elevational view of the side motor brake and electrical connections thereto.

Figure 21 is a plan view of a segment of the overlead indicator face with the pointer and its roller resting upon the non-insulated portion thereof.

Figure 22 is a view similar to Figure 19 but with some of the parts in a different position.

Figure 23 is a view similar to Figure 20 but with the parts in different positions.

Figure 24 is a view similar to Figures 20 and 23 but with the parts in a third position.

Figure 25 is a view similar to Figure 18 but taken after the pointer has moved to another insulated portion of the dial.

Figure 26 is a view similar to Figures 19 and 22, but with the parts in still a different position.

Figure 27 is a view similar to Figures 18, 21 and 24 but with its parts in still a different position.

Figure 28 is a view similar to Figures 19, 22 and 25 but with the parts in a different position.

Figure 29:
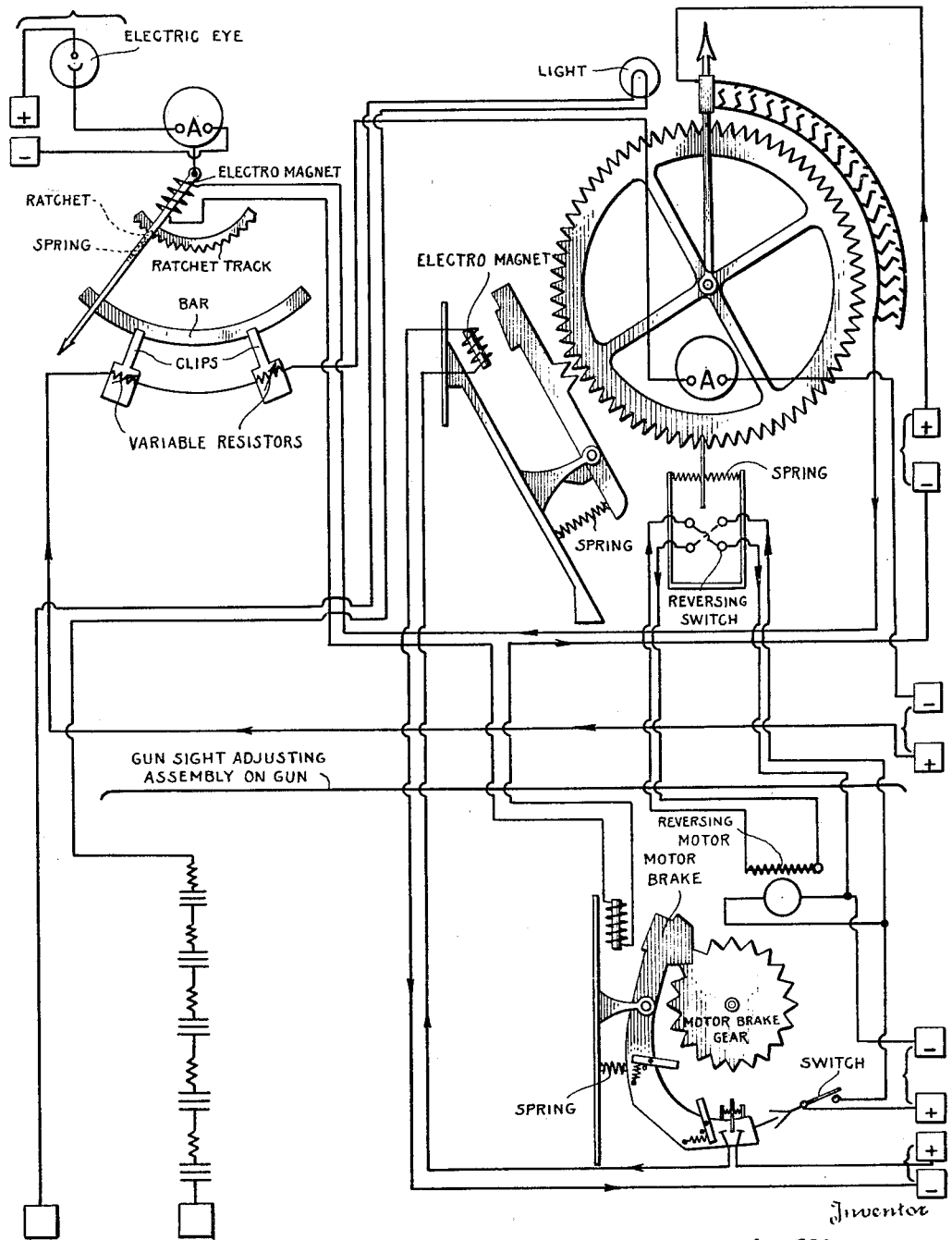

Figure 29 is a wiring diagram showing the electrical connections to the several parts of the apparatus.

General description

The drawings have shown the rear sight of the type known as a ring sight but it is of course to be understood that any suitable type of front or rear sight may be used. In order to take a lead on a target such as a plane which is moving transversely to the line of fire, the gunner moves the gun (or its platform), and assuming that he is using the ring sights, said gun is moved so that he sees the target on one side or the other of the center line to the bead. The distance that the target is from the center line to the bead determines the amount of lead as measured in transverse distance, and this amount is caused to vary depending upon the line of fire, distance of the target, and time relationship. The taking of lead is what is known as "normal aiming lead," and trained gunners take this "normal aiming lead" with a speed and accuracy of the human reflexes.

It will be appreciated that the dimmer the light the more the tendency is for the human reflexes to lag behind in following the target and it is the primary purpose of this invention to provide an automatic device which takes care of the varying degrees of dimness of light in gun aiming, which may be manually adjusted according to the reflexes of the individual gunner.

The human eye like the camera requires time for the formation of the image on the retina. The less the amount of light there is, the greater the time which is required to form an image in the eye, as in a camera.

When the target is moving at great speed, such as the speed with which a plane moves across the line of sight of a gun, this time lag in the formation of an image upon the retina inevitably causes a retinal displacement of the apparent position of the target aimed at. A gunner never sees a transversely moving target where it actually is but only where it was. In broad daylight the aforementioned time lag is so small that except under aiming conditions of close range and high rate of motion of target transverse to line of sight the retinal displacement is negligible in aerial gunnery. At night, however, or at other times when the source of light is dim, the time lag is so much greater, that the size of the retinal displacement and its affect upon a gunner aiming at a target is considerable.

Therefore when taking aim and under dim light conditions at a target moving transversely to the line of sight the lead that would give the gunner a hit if the target plane were really where he sees it, is insufficient because the retinal displacement area is greater and he will miss unless he adds the right amount of lead in excess of that which was sufficient for broad daylight conditions. In other words under such dim light conditions he must have "over" normal lead termed "overlead."

The visual senses of the gunner are unable to gage accurately the amount of light at different times and hence the amount of overlead, and heretofore the gunner has not been furnished with any instrument for the purpose of accurately compensating for the difference in retinal displacement due to changing light conditions. When it is also appreciated that the amount of retinal displacement varies with individual gunners it will be understood that there exists a real need for an instrument which automatically enables a gunner to take the proper amount of overlead determined to be correct for the individual gunner under the light conditions existing at the time; an instrument which automatically applies the determined correction to the aiming by adjusting the sight with which the aiming is made.

Necessarily the determination of what amount of overlead is correct in each case is a deduction from factual data of the several factors of the aiming, particularly, factual data of the optical effect upon the gunner's eyes of light of the intensity acting upon the gunner's eyes at the time. Such relevant factual data is obtainable from camera gun pictures of aimings taken in combat practice adapted for such purposes, and the analysis of the same according to the methods well known in the art of aerial gunnery.

*Outline of general plan of construction of the device*

The apparatus of this invention, hereinafter more fully described in detail, comprises three main essentials: a light sensitive element whose reaction to light received by it initiates operation of the apparatus, a sight adjusting means and means for the operational transmission of impulses from the light sensitive element to the sight adjusting means and subjection of such impulses to control and modification appropriate to actuating the sight adjusting means to adjust the sight effective of the object. Herein these three divisions of the apparatus are illustrated as separately housed, with appropriate circuit connections, see Figs. 1, 2 and 3. But arrangement of housing is immaterial, except that the sight adjusting means must necessarily be in operational connection with the gun sight and the light sensitive means must be located in a position where it receives light of approximately the same intensity as simultaneously acts upon the eyes of the gunner during an aiming. The operational transmission means may be located where most convenient, and suitable circuits connect with the light sensitive and the sight adjusting means.

*Assemblies in order of their participation in operation*

1. The light sensitive means is designated by the numeral 1, shown in Fig. 1. It is set in a circuit 2 (Figs. 1, 2, and wiring diagram Figure 29). This circuit passes from connection with suitable power source connection through the light sensitive means 1 to connect with and energize the light intensity indicator, an element of the operational transmission means, hereinafter described. According to the nature of such means the amount of current passed is varied by it as a function of the light intensity acting upon it.

2. The operational transmission means, hereinafter more fully described and designated as the overlead indicator is shown in Figs. 2, 4, 5, 7 and for electrical connections see wiring diagram, Fig. 29. The overlead indicator is an assemblage of elements which constitute a computing, indicating and control instrument. Its operation is activated by variations in the current it receives through circuit 2 from light sensitive means 1. The component sub-assemblies of the overlead indicator are separately outlined in more detail immediately following this main outline and are described in detail in the later description of detail. The general result of the operations of these components of the overlead indicator is that through suitable circuits 33 and 34, subject to action of a relay circuit 35 (see Figs. 2, 3, 7, and wiring diagram Fig. 29) there passes to energize and activate the operation of the sight adjusting means, electric impulses controlled in amounts and order of time of occurrence as hereinafter described.

3. The sight adjusting means. It is illustrated herein, see Figs. 3, 11, 12 and 17, as a motorized mounting carrying sight parts, with appropriate gears and controls for driving and adjusting the position of movable sight parts. But it must be understood that for the purposes of this invention there are many forms of sights and sight adjusting means suitable for use in this invention, and that it is immaterial which one of the suitable forms is employed, provided that the one used be automatically and appropriately responsive to the energization and activation received from the overlead indicator. In the form of means illustrated, suitable sight adjusting means operate to move the form of sight, for which the adjusting means are adapted, closer to, or further from, the eyes of the gunner, whereby the angular relation between the gun axis and the apparent line of sight to the target is varied, imposing a geometric change of value upon whatever aiming lead is in process of being taken at the time. The amount and the time of this operation is controlled, as stated in the preceding paragraph by the impulses of the circuit connections with the overlead indicator, circuits 33, 34 and 35. Hereinafter in detail are described the means in the overlead indicator, whereby through such control the operation of the sight adjustment means is made appropriately corrective of the effect upon each aiming, of the optical effect of the light acting at the time upon the eyes of the gunner with relation to a target moving transversely to line of sight.

The three sub-assemblies of the overlead indicator

1. The light intensity indicator is in essential parts, a means of translating electrical energy into mechanical movement designated by the numeral 50 in Figs. 4, 5 and wiring diagram Fig. 29. It is energized by the current passing through circuit 2 from light sensitive means 1 (wiring diagram Fig. 29), whereby the mechanical movement, of a pointer 57, is a function, and indicative of the light intensity acting at the time upon the light sensitive element (and upon the gunner's eyes).

2. The correlation assembly is based upon a circuit 31 which has a suitable connection with a source of power (Figs. 4, 5 and wiring diagram Fig. 29) and in the circuit there is set a series of current varying elements 61, see Figs. 4, 5 and 29, each of which is operationally connected with an operational element 60 (see Figs. 4, 5 and 29), appropriate to effect operation of the respective current varying element upon activation. The operational elements are manually movable, adjustable and settable in predetermined positions within the pathway of movement of pointer 57 of the light intensity indicator; positions wherein movement of pointer 57 along its pathway activates operation of the operational elements of the current varying elements, whereby the time of operation of a current varying element is a co-function of the position of its operational element and the occurrence of that certain light intensity which activates the pointer 57 to arrive at that position to activate the operational element. There are operational connections of circuit 31, through the face assembly of the overlead indicator and circuits hereinafter described, with the sight adjusting means, whereby upon any variance of current of circuit 31 by operation of any given one of the current varying elements, set off is effected on the sight of a definite amount of overlead, an amount which is predetermined from the hereinbefore mentioned and hereinafter fully described deductions from factual data relevant to overlead to be appropriately corrective of the aiming effect corresponding to the optical effect of a certain light intensity upon the eyes of the gunner. By a process herein described, the operational element of that given current varying element is set within the pathway of pointer 57 in that position wherein it is activated by the pointer upon occurrence of that certain light intensity, whereby for that gunner's eyes overlead correction is automatically caused to be applied to the sight in amount appropriate to that certain light intensity. The same process effects the same results for the other operational elements in relation to other respective light intensities. The number of operational elements and the corresponding current varying elements, each correlated to a light intensity, may be made as large as is desired. Herein the series of current varying elements 60 and operational elements 61 are illustrated respectively as a series of 20 variable resistors with an operational rod each. But it is to be understood that there are other forms of current varying elements and of elements to operate them which may be used to vary the amount of current in circuit 31 upon activation by movement of the movable member, pointer 57, of the light intensity indicator.

3. *Face assembly of the overlead indicator.—* It is based upon another means of translating electrical energy into mechanical movement designated by the numeral 51, shown in Figs. 4, 5, 7 and 29. It is energized by the current passing to it through the connected circuit 31, whereby the mechanical movement of a cogwheel 47 and a radius thereof extended as a pointer 48, is a function of the amount of overlead determined to be corrective of the effect upon aiming of the optical effect (of light intensity) upon the gunner's eyes, as described within the last previous paragraph and hereinafter in more detail. This indicator is provided with a scale with points appropriately numbered and spaced in an arc of translucent material similar and adjacent to the arc of movement of the pointer 48. Behind the sealed arc 68, there is a light 52, whereby the scale readings of position of the pointer 57 are readily photographicable, see Figs. 4 and 7. It is arranged that the scale readings be photographed synchronously with the taking of the previously mentioned camera gun pictures, as part of the provision of the factual data relevant to overlead, which is material for the analysis of data whereby the deductions are made for use in determining the positions into which are set the manually settable operational elements as described more fully hereinafter. In operational connection with pointer 48 and cogwheel 47, and operated by movement thereof, there are a reversing switch 45 in circuit 34 and a series of circuit breakers in circuit 33 having a connecting switch roller 65, see Figs. 4, 7 and 29, whereby the operation of the circuit connected sight adjusting means is activated and controlled. Also in operational connection with cogwheel 47 there are limiting ratchets, which when activated as hereinafter described, through a relay circuit connected operationally with the sight adjusting means effect enforcement of correspondence of position between the sight and the overlead indicator pointer 48.

Elements ancillary to preceding essentials

A circuit 32, connected with a suitable power connection, shown in Fig. 29, is connected with and energizes the light 52, previously described, and shown in Figs. 4 and 29, a series of thermostats and a series of resistance heating coils. The thermostats and heating coils are not essential to the invention but are recommended for use within it as affording protection against possible obstruction of operation of the apparatus by ice and cold. The thermostats designated by the numerals 53, 114, 105, 108 and 83 in respective numerical order regulate heating coils designated by the numerals 54, 112, 106, 91 and 84, both series are shown in Figs. 4, 11, 12, 13, 15, 17 and 29. Similarly recommended ancillary protection elements are, a water drainage channel 89 shown in Fig. 11 and its connected pipe and orifice 90 shown in Figs. 12, 13, 15 and 17, and hydroscopic cartridges 55 and 113, shown respectively in Figs. 4 and 17.

Details of apparatus

*The light sensitive means.*—In the drawings, referring to Figs. 1 and 29 numeral 1, shown in Fig. 2 and in Figs. 1 and 29, indicates a light sensitive instrument such as an "electric eye." The light sensitive instrument, which includes a photo-electric cell or device of similar operational effect, may be located any distance from the rest of the apparatus where it will be exposed to light of approximately the same intensity as simultaneously affects the eyes of a gunner during the taking of an aim, the position recommended but not required, is such attachment to the sight or the gun mounting as to provide approximately the same view and tracking of the target as affect the eyes of the gunner. The light sensitive instrument is provided to be of that degree of sensitivity as to operationally function in response to the intensities of light relevant to overlead. Lead wires 2 connect with, and convey electrical energy to the light intensity indicator, a part of the overlead indicator, hereinafter described.

It is to be understood that the wires 2 are connected with a suitable source of current, see wiring diagram, Fig. 29, and that the current which flows from the "electric eye" is changed in approximate proportion to change in light intensity acting upon the "electric eye," and that current passing through the light sensitive element 1 and circuit 2 connecting with the light intensity indicator may be amplified in amount respective to the need for and usefulness of greater power in operation of that indicator by means of amplification within the light sensitive elements and circuit 2, or a power followup in circuit 2.

Overlead indicator

The light intensity indicator is the first part of this instrument connected with the electric eye 1 by circuit 2, see Figs. 1, 2 and 29. It is a means of translating electrical energy into mechanical movement, and an ammeter is a suitable form of such means for this device, and it is designated herein by the numeral 50 and illustrated in Figs. 4, 5 and 29. The ammeter 50 has a dial 56, shown edgewise in Fig. 4, and in elevation in Fig. 5. The moving element of ammeter 50 is the pointer arm 57 which moves in an arc over the dial 56 as the current in circuit 2 is varied in amount by the light sensitive element 1 in response to variance of light.

This arc dial bears a scale 80 (Fig. 5). The distance between the several numerals on the dial is such that a definite light change will cause the pointer to move from one numeral to the other. The calibration and marking of this scale as shown in Figure 5 sets off twenty equal distances, marked off between twenty-one numerals, "0" to "21," consecutively and inclusively, but may be for any convenient scale other than that shown and this corresponds to the numbers on an overlead indicator scale, hereinafter to be described.

Placement of the numbers in the scale is so arranged that the number "0" indicates that point on the scale where when the pointer is located above the same, maximum light intensity is present, it being assumed that this same light intensity impinges on an "electric eye" and is present at this particular time during the aiming of the gun by the aerial gunner; and that when the pointer is over the numeral 20 minimum light intensity will be present.

Thus the scale is an inverse scale inasmuch as when the light intensity decreases such decrease will read a higher number on the scale.

The scale 80 is an inverse expression of light intensity and the movement of the pointer 57 past any point in its range indicates a change of amount of light intensity in any unit adopted.

The correlation sub-assembly of the overlead indicator

As previously described in general description of construction this correlation sub-assembly is operated by the immediately preceding described element, the light intensity indicator.

Referring again to dial 56 of that light indicator, it will be noted that this dial carries the correlation bar 58, see Figs. 5 and 6, and it will be further noted that the pointer 57 extends radially beyond the dial and far enough over the bar 58, so that the pointer will, in its movement, successively contact the several members of a series of variable resistor elements designated by the number 61, see Figs. 4, 5 and 6.

The series of variable resistors 61 are successively set in circuit 31, which circuit is hereinafter described, in series, and are themselves severally mounted upon the respective several members of a series of clips designated by the numeral 78, see Figures 5 and 6, and 29. The two series of both are of number of members, 20, equal to the number of equal distances set off on the scale 80 on the dial face 56, as described. Note, in Fig. 29 only the first and last members of the series are shown, the similarity of the others is to be understood.

Each of the clips is held in a clamping position upon correlation bar 58 shown in Figure 5, by spring means, not shown. The location of a spring clip necessarily locates the resistor 61 which is mounted upon it, and also locates the operating rod 60 of that resistor.

Adjustment of location of each of these clips with relation to the scale of inverse light intensity 80, and the arc of the pathway of movement of pointer 57, may be effected by means of manual shifting of the clips along the correlation bar 58; this manual adjustment of position, of location, of these clips 78 on the bar 58 is to be made by procedure, and with respect to light intensities, and as a result of tests and determinations and from factual data relevant to overlead and to the optical effect of light intensities upon the eyes of the gunner, as is subsequently described.

It is to be understood, however, that once the proper adjustment has been made, the arrangement will stay in the position in which it has been placed, until and unless there is another manual adjustment of position, which would be occasioned by assignment of the instrument to a gunner other than the one to whose optical reactions the instrument was originally adjusted, as hereinafter described.

The several members of the series of resistors 61 are similar and provided to be of resistance equal one to another, and effect such unit change of amount of current passing in the circuit 31 in which they are set, and the description of one member applies to every member of the series, of resistors 61, rods 60 and clips 78.

The clips 78, each with its resistor 61, are so set with respect to the pathway of pointer 57 that each of the operating rods stands up into that pathway and during movement of the pointer upon contact each rod is pushed through the range of its own motion of operation by the pointer.

In the drawings, Figs. 4 and 5, the resistors 61, are diagrammatically illustrated and it is to be understood from the symbolic illustration showing them in the line of circuit 31 in proximity of the clips 78 that their actual position is as illustrated in the wiring diagram 29, set in sections of line of circuit 31 each placed crosswise the top of a clip 78, the whole series approximating an arc similar and in juxtaposition to the arc of movement described by the pointer 57.

It is to be understood that the construction of a resistor of series 61 is that of a common type of composition resistor of rotary form provided with an operating element, rod 60, that the construction is light whereby it may be operated by a very light push by the pointer 57, and that the rod 61 is of very slight and somewhat elastic construction whereby enough resistance is offered to a push of the pointer 57 to transit enough force to effect operation of the resistor, yet, on the continuance of pressure by the pointer, allows the upper end of the rod to bend over enough to let the pointer slip past, whereupon the rod straightens itself, without by so doing, effecting the position of the rotary element of the resistor. The straightening of the rod puts its upper end again within the pathway of the pointer 57 insuring contact with it upon reverse movement of the pointer.

It is to be further understood that all resistors of the series 61 are set in series in the line of the circuit 31 and in such position with relation to the movement of the pointer 57 that movement in the direction which is up the reading of the scale 80, that is, in the direction toward the right as the arrangement is illustrated in Fig. 5, causes operation of them upon successive contacts with their severally respective operating rods 60 to effect minimum resistance to passage of current by each resistor so operated; and conversely when pointer 57 moves in the reverse direction, and of course, the variance of amount of current is the converse of amount of resistance.

It is to be understood that circuit 31 has suitable connections for connection with a suitable source of power, and passes on through the section in which the series of variable resistors 61 are set, to connection with, and energization of, a second means for translating electrical energy into mechanical movement within the face assembly of the overlead indicator, hereinafter described and designated as ammeter 51, see Figs. 4 and 29, and it is to be understood that such power shall be, in amount adapted to the work to be done by the translating means, ammeter 51.

Ammeter 51, as hereinafter described, in response to the variation of amount of current in circuit 31, operates the face assembly of the overlead indicator whereby is effected indication of overlead and activation of controls and mechanisms whereby overlead is set off by the sight adjusting means.

It is to be noted from the description of scale 80 hereinbefore that scale 80 ranges from the light intensity which is too great to necessitate much optical need for overlead in aiming, designated as "maximum" intensity (for operation of instrument), to such light intensity as is the least intensity providing visibility sufficient for use of overlead or any other visual aiming. It follows that any light intensity which activates movement of the pointer 57, included within the range of scale 80, is such a light intensity as effects some amount of optical need by the gunner's eyes for overlead set off to correct aiming for optical effect of that light intensity.

It further follows, from the construction previously described or referred to, that each occurrence of the contacting and operation of an operating rod of a resistor 61 by pointer 57 is a consequence of the occurrence of the same light intensity affecting both the light sensitive element 1 and the eyes of the gunner, and that such certain light intensity occasions need for set off of that amount of overlead on the sight which is corrective for the optical effect of the light intensity upon the gunner's eyes.

And furthermore, each occurrence of operation of a variable resistor upon activation, by movement of pointer 57, has a consequent effect upon the set off of a definite amount of overlead on the sight.

In order to employ the above characteristics of the described construction in accomplishment of the general object of the invention it is necessary to have the use of factual determinations within the scope of the art of aerial gunnery, it is necessary to have the factual determination of the amount of overlead set off on the sight correct for the optical effect upon the eyes of the gunner by any light intensity for which appropriate data is obtainable and for which manual adjustment of the instrument is desired. When such factual determination is available, then, that one of the variable resistors 61, whose operation has the consequence, as above described, of the set-off of approximately the amount of overlead determined to be corrective of the optical effect of the particular light intensity, is placed, by manual adjustment at such location on the correlation bar 58 that its operation will be activated by the movement of the pointer 57 upon every occasion of the activation of the movement of the pointer by that particular light intensity.

By such calibrative procedure of adjustment the elements of the described construction of the correlation assembly is made capable of effecting activation of the chain of consequences resulting in the set-off of overlead on the sight in appropriate correlation with the optical effect upon the gunner's eyes of any light intensity affecting both the eyes of the gunner and the light sensitive element 1, and for which adjustment is desired, and the factual determination is obtainable.

That necessary factual determination may be obtained from data obtainable by use of the techniques standard in the art of aerial gunnery practice and training.

Reference is made to camera gun pictures of aimings taken in aerial combat practice, and the analysis of, and determination made from same.

The general nature of such technique is too well known to those skilled in the art to require description in detail herein, but the outline of what is applicable herein follows:

In aerial gunnery and practice there is combat practice of plane with plane wherein, instead of real guns, camera guns are employed. Gunners aim at target planes, but upon pulling the trigger, instead of firing, in each instance a picture is taken by the camera which views with center of focus parallel to axis of gun. The picture shows the relation of the gun axis, the rear gun sight and the target plane as seen through the ring of the sight, in case the ring type rear sight is used in the practice (as it is in the description herein).

The picture record of the target plane discloses the type of the plane, from which its speed may be deduced, and shows its angle of direction of motion with the gun axis, and from the ratio of size of the image to the known size of that type of plane, the range distance is deduced. From the relation of the position of the target image in the picture to the gun axis is deduced the size of the lead angle, which is the angle between the line of vision of the target and the gun axis. Thus, the picture directly discloses the amount of aiming lead actually used. And from the recorded facts and the deductions from them, and the known time of flight of a bullet, if aerial gun were used, there may be determined, by the relevant mathematical methods, what amount of aiming lead should have been used.

The above technique can be adapted for use in the manual adjustment of this invention, as follows:

Since the device is designed to function during conditions of light intensity less than normal daylight, the practice should be night practice. The planes used in the practice to obtain the desired data should be equipped with sufficient heat or infra red illuminating units to recognizably record their outline on suitable film used with appropriate night type camera guns. Such equipment is available, and is used in night combat practice at the present time.

The planes for this practice should also be equipped with parts of this invention, namely; the overlead indicator and the light sensitive element 1. For this practice the gun sight assembly is not needed and should be disconnected and left out.

The light sensitive element 1 should be put into its service position on the plane where it is exposed to approximately the same light as affects the eyes of the gunner, and is connected by circuit 2 with the overlead indicator. The overlead indicator should be the same one that is to be adjusted to the eyes of the gunner conducting this aiming practice.

For this practice the overlead indicator should be placed in a photographic box cabinet and faced by an instrument photographing camera. The overlead indicator has a scale 68 illuminated by light 52 to facilitate the photographing of its readings, as is subsequently described, as shown in Fig. 4.

The trigger of this camera facing the overlead indicator should be connected with the trigger of the night camera gun, so that every time the gunner takes an aiming, the camera in the cabinet photographs the reading on the face of the overlead indicator simultaneously with the photographing of the target plane aiming by the camera gun.

Then the practice is performed.

Adjustment to individual gunner

Upon return with the pictures, the overlead indicator and its light sensitive element 1 is set up in an instrument room and connected with a suitable source, and exposed to artificial light.

The artificial light is adjusted in intensity to act upon the light sensitive element 1 until the element 1 is so affected as to activate operation of the overlead indicator as hereinbefore described until the pointer 48 of the face assembly of the overlead indicator (hereinafter described) moves to exactly the same point opposite the scale 68 as it was pictured to have been when the camera gun picture of an aiming was made. The light is then left acting on the light sensitive element 1 at constant intensity. That intensity is obviously the same as affected both the light sensitive element and the eyes of the gunner when the camera gun picture was made.

From the simultaneously taken camera gun picture, it is determined, as hereinbefore described, what amount of aiming lead should have taken, and comparison is made with the camera gun's picture of the lead actually taken. If they are the same, then the pictured aiming corresponds to a hit, and no change in adjustment of the overlead indicator is necessary for the light intensity involved.

But if the comparison reveals the frequent case of an error in lead, it may be assumed that retinal displacement, lag, the optical effect of subnormal light on eyes viewing a transversely moving target, is a factor, and that while the gunner may, or may not, have set off for the speed and angle of the target plane the amount of lead appropriate to take if the target had actually been where he apparently saw it, the fact is revealed by the picture record of aim actually taken, that the lead taken was not enough, that overlead was needed, to make the actual lead appropriate under the conditions.

The adjustment for correction is simply made to conform with the determination of aiming lead needed.

The amount of overlead needed in this case is that amount by which the amount of lead determined to be the correct amount is greater than the lead actually taken and pictured.

The amount of overlead needed, as so determined, should be applied to the amount of overlead which was indicated in the picture of the overlead reading, and then the adjustable means, the movable variable resistors 61, should be adjusted in location on the correlation bar 58, in the pathway of pointer 57, so that their future action, upon repetition of occurrence of the same light intensity would have as a consequence the effecting of the corrected overlead indication. It is, of course, to be understood, that the mathematical expression of the amount of overlead determined to be needed, is mathematically convertible into terms of indication of overlead on the overlead scale 68, no matter what particular unit of scaling should be adopted for that scale.

The manual adjustment is performed as followers: First make a chalk mark on the overlead scale 68 at the location thereon respective to the additional amount of overlead determined to have been needed in the picture aiming. Then manipulate the location of that particular variable resistor 61, whose operation has the consequence of movement of pointer 48 to the location chalk marked upon the scale 68. Move that resistor 61 along bar 58 until its operating rod 60 is contacted, and the operation of the resistor is activated by contact with pointer 57 as it stands in its pathway at the location thereon where the light intensity of the time of the pictured aiming is, as reproduced artificially, keeping it.

When that has been done, the overlead indicator is in proper adjustment for that particular gunner for aiming in the same intensity of light which was affecting his eyes during the aiming which was pictured, and with the gun sight assembly connected with the adjusted indicator, the gun sight assembly will effect set-off on the sight to correspond with the corrected overlead indication, as hereinafter described.

The same process may be repeated for as many different pictured aimings taken under the conditions of as many different light intensities as may be desired to complete adjustment.

Face assembly of the overlead indicator

Figure 7:
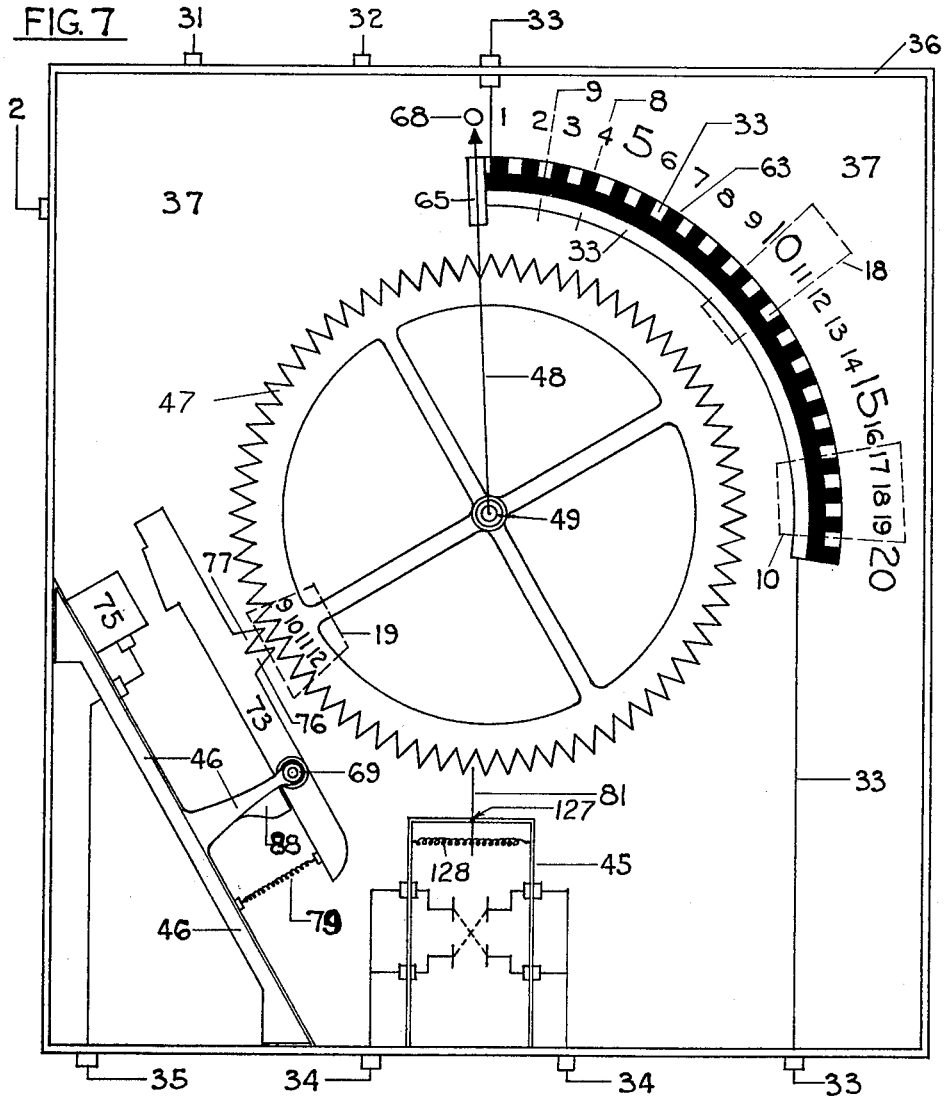
Figure 7 is a side elevation of the overlead indicator on an enlarged scale such as shown in Figure 2.

This assembly is based upon a second means of translating electrical energy into mechanical motion, and it is to be understood that other types of such means may for this purpose be used in this invention, the form selected for illustration herein is an ammeter designated by the numeral 51, is energized by the connecting circuit 31, and shown in Figures 4, 7, and wiring diagram Figure 29.

When the previously described variation of current passing through circuit 31 occurs, the variation causes operation of ammeter 51 to effect rotation of the ammeter's shaft 49, the attached cogwheel 47 and the extended radial pointer 48. The pointer 48 is adapted to move over a scale 68 on the dial face 37, the numerals of which correspond to the numerals on the dial 56 of the light intensity indicator, see Figure 7 and compare with Figure 5.

The dial face 37 may be translucent and behind it is a light 52, which is energized by a connected circuit 32, as is illustrated in the side elevation of the indicator shown in Figure 4 and in the wiring diagram Figure 29, in order to facilitate the photographing of the readings on the overlead scale 68 as hereinbefore described.

From the description of the correlation assembly hereinbefore, it will be noted that the amount of current passing through circuit 31 is made to change in amount by whatever sized unit of change may be adopted, whenever a current varying element is operated as described. And the unit of change that is adopted shall be made sufficient to effect movement of pointer 48 over the scale 68 by such distance as may be adopted as the interval between successive points of the scale 68.

The scale 68 is so set up upon the dial face 37 in relation to the turning action of the pointer 48 that movement of the pointer occasioned by an increment of current through circuit 31 causes the pointer to move by numerical scale to indicate a greater amount of overlead, and conversely for decrease of that current.

The reversing switch component of the face assembly of indicator

The assembly of the motor reversing switch designated by the numeral 45 comprises the switch, set in the line of a circuit 34 between the circuit's connection with a power source terminal and connection with the motor of the sight adjusting means, hereinafter described, and also comprises its operating rod 81 and the hinged mounting of that rod designated by the numeral 127 and a spring 128, all illustrated in the elevation of the overlead indicator face assembly, Fig. 7, and in the wiring diagram, Fig. 29.

The operating rod 81 is so set with relation to cog wheel 47 that normally its upper end is slightly within the arc of movement of the cogs of wheel 47 but out of contact and approximately halfway between cog points, whereby upon unit movement in either direction of cogwheel 47 the rod 81 is first contacted, by the neighboring oncoming cog, and pushed over, and then passed by the contacting cog, whereupon the spring 128 pulls operating rod 81 back into its normal position, wherein the next ensuing unit movement of cogwheel 47, in either direction, will cause repetition of action of rod 81 in a direction of movement respective to the direction of movement of the actuating cog.

The other end of the rod 81 is in a position suitable to operate the rotary element of the reversing switch 45. This switch is indicated in the drawings by symbol only, it may be a conventional form of rotary, two pole, reversing switch, but it is to be understood that movement of the rod 81 by construction position involves a push by the lower end of the rod against the rotary switch element in the nature of ratchet action whereby the rotary element is moved into a position whereby connection of one of the two pole sets of contacts is effected, and it is also to be understood that according to the nature of such single step ratchet type reversing operational connections, if the next succeeding push of the rotary element by the operating rod is in the same direction, the rotary element is not engaged and does not move, but also according to the nature of such connections, upon the next movement of the rod in the other direction, the ratchet connection engages and the rotary element is moved accordingly.

It is to be understood that each such movement of the rotary switch element effects connection of one and disconnection of the other of the two sets of connections therein.

The motor, designated by the numeral 97, of the sight adjusting means, is reversed by reversing the polarity of its field, and connection of the lead from the positive terminal of its power source with one pole of the field actuates operation of the motor drive to set off greater lead on the sight; and conversely, connection of that lead with the other pole of the field actuates motor drive in the direction to set off less lead.

The wiring diagram Fig. 29 illustrates suitable wiring from the positive and negative terminals of power supply connections to the reversing switch 45, and wiring from that switch to the poles of the field of motor 97. It is to be understood that within the switch 45 there are contacts and connections suitably arranged for alternatively effecting both of the set-ups of connections, and that on the operating movement described a set-up of connections is effected, and that the arrangement of position of operating rod 81 and of the switch 45 is such that when the operating movement of rod 81 is actuated by a movement of cogwheel 47 in process of indication of higher overlead as described, a movement that is clockwise in the illustration of the cogwheel 47 in Fig. 7, and that the set-up of connections for actuating set-off of greater overlead is effected through switch 45; and conversely, when the movement of cogwheel 47 is counterwise, in process of indication of less overlead.

The sub-assembly of switch roller 65 in circuit 33

Figure 8:
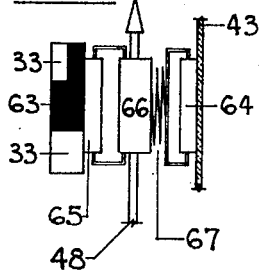
Figure 8 is a detail view of the roller assembly in side elevation when it has reached the point shown in dotted lines in Figure 7.
Figure 9:
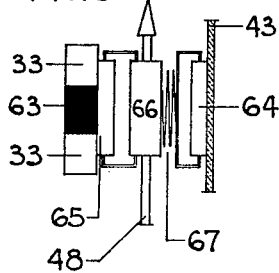
Figure 9 is a detail view of the roller assembly in side elevation when it has reached the point shown along the dotted line 9—9 in Figure 7.
Figure 10:
Figure 10 is a front elevation of the track taken on the line 10—10 of Figure 7.

This in an assembly of circuit breakers operated by a switch roller 65 set in the line of circuit 33 and illustrated in the wiring diagram Fig. 29, in the elevation of the indicator face assembly, Fig. 7, and the track parts are shown in detail in Fig. 10, and Figs. 8 and 9 are cross sectional views of construction of the roller assembly.

This switch assembly connects and disconnects circuit 33 when operated as hereinafter described.

Figure 12:
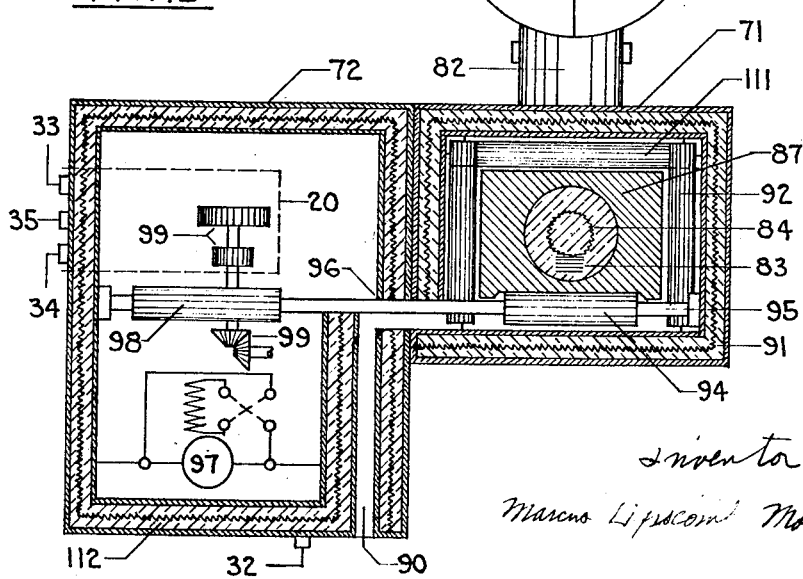
Figure 12 is a view partly in cross section of the rear gun sight taken on the line 12—12 of Figure 3.

Circuit 33 (see Figures 2, 3, 4, 7, 8, 9, 10, 12, and 20) is connected with an appropriate power source, and passes through this roller switch assembly at the overlead indicator face assembly to connection with electromagnetic control parts attached to and a part of the gun sight assembly (see Figures 2, 3 and 12) where it is an activating means of control of the motor brake 100 on the sight motor 97 and motor brake 100 is not only a brake, but secondarily controls connection and disconnection of sight motor power circuit 34, see Figures 12 and 20, and description hereinafter.

Also a branch-off of circuit 33 between the roller switch section and connection with the gun sight assembly, is connected with electro-magnet 125 to control brake 74 on pointer 57 as is described hereinafter immediately following description of this roller switch assembly.

Note from Fig. 7 that: the switch sections of the line of the circuit 33 extend for the whole arc in the upper right hand quandrant which is just inside the arc of scale 68 and is similar to the arc of that scale.

The line of circuit 33 within that switch arc is in two sections of flat wire.

The section leading in at the top, and running around outer periphery, is conected with the power source. The section leading out at the bottom and around the arc on the inside of the other section, leads to connection at the gun sight assembly.

The two sections thus overlap each other for the length of the arc, but are separated by insulation material 63.

The upper and outer section has, opposite each numbered point of the adjacent scale 68, a surface section of insulation 63. Opposite the space intervals between numbered points on the scale 68 the surface of the section is not insulated. The inner and lower section has no insulated surface.

The roller assembly of the switch is carried by the pointer 48 (see Figs. 7, 8 and 9). The range of movement of pointer 48 is co-extensive with and over the switch sections of line 33 above described. The switch roller 65 straddles the two sections of line 33 which make a track for the roller when it is carried along by movement of pointer 48 (see Figures 7, 8 and 9).

The roller 65 is a conductor, and in contact with both of the above described switch section of line 33, except when the outer end of the roller 65 is on an insulated portion of the surface of the outer section of line 33, which occurrence effects disconnection of circuit 33.

It is to be noted that whenever the pointer 48 is at a numbered point on the scale 68, the roller's outer end is on insulated surface of the outer section of line 33, therefore when such is the location of the pointer 48 circuit 33 is disconnected, but when pointer 48 is in process of moving from one numbered point to another, is between points, then the upper end of the roller 65 is in contact with live wire surface and circuit 33 is thereby connected.

The switch roller assembly may be provided with the common auxiliary details of a non-conducting roller 64 (see Figures 8 and 9) which may use the inner surface of the dial face cover 43 (this cover is of glass or other transparent material and is shown in cross section in Figures 4, 8 and 9), as a track, mounted upon pointer 48 opposite to roller 65 by a spreading spring mounting 67. The purpose of the spring is assurance of maintainance of contact of roller 65 on surface of sections of line 33 which it uses as its track (see Figures 8 and 9).

Such is the construction of the assembly brake motor control switch which effects connection and disconnection in control circuit 33, the construction which is described herein as one form that may be employed for that purpose subject to activation by movement of the cogwheel 47 and attached pointer 48, but it is to be understood that the essential thing is that some switch means of effecting that purpose subject to the activation of the movement of cogwheel 47 and pointer 48 should be provided and not that the form should be the particular one described here for illustrative purposes only. Any form of means to effect the connection and disconnection switch function in circuit 33, and which may be activated to so operate by movement of the cogwheel 47 and the attached pointer 48, and which is within the limits of the appended claims may be used in this invention.

There is another branch of the line of circuit 33, branching off between the above described switch section and the connection of the line with the gun sight assembly, and going to a connection with a brake assembly attached to the pointer 57 of ammeter 50 of the inverse light intensity indicator (hereinbefore described). It may be traced in the wiring diagram, Fig. 29. The brake assembly is also shown in Fig. 5 in its position on the pointer 57 of the light intensity indicator. Though this brake assembly is attached to the hereinbefore described light indicator, it is described here in relation to circuit 33 and the overlead face assembly, because the latter parts control its action.

This brake assembly comprises an electro-magnet designated by the numerals 125 and is connected with and energized by circuit 33, a sliding toothed brake element composed of magnetically sensitive material, designated by the numerals 74, and a spring 126 which is attached to the end of ratchet brake 74. At the end farthest away from the magnet 125, all these parts are carried by pointer 57 as illustrated in Fig. 5 and Fig. 29. A ratchet toothed arc, designated by the numeral 59, is attached to the dial face 56 under the pointer 57 and is coextensive with the arc of the latter's movement. It is to be understood that when circuit is open and magnet 125 is energized it attracts ratchet 74, overcomes the pull of spring 126 and the ratchet brake tooth slides toward the magnet, and that the position of the assembly bears such relation to the position of the toothed arc 59, that this movement of ratchet 74 brings them into contact and engagement of braking effect upon pointer 57, whereby pointer 57 is precluded from movement for so long as circuit 33 remains open. Conversely when circuit 33 is broken, magnet 125 cannot hold ratchet 74 against the pull of spring 126, which retracts the ratchet, releasing pointer 57.

The converseness of the reciprocal control actuation of circuit 33 upon the braking of movement of the light intensity indicator and the sight moving motor should be noted. From the immediately hereinbefore description of circuit 33 it will be noted that when circuit 33 is broken, the sight moving motor 97 is braked and its power circuit is cut, conversely, circuit 33 is open the motor is unbraked and its power circuit 34 is open. This construction is a measure of enforcement of correspondence between overlead indication by the overlead indicator and set-off of overlead by the motor action, the motor being thereby assured of time to complete a unit action before its activation can change.

The third of the control system assemblies, comprised in the overlead indicator and whose operation is activated by movement of cogwheel 47 of the ammeter 51, is the relay limiting ratchet assembly. There is an elevation of it in the lower left quadrant of Fig. 7. In Figure 4 it is viewed edgewise and is largely obscured by the support part 46.

The relay limiting ratchet assembly comprises the support 46; in the pillar section, near the middle of the support there is an axle 69, which carries a brake beam 73, which carries two ratchet teeth 76 and 77 and at one end of the beam there is attached a spring 79 whose action is to constantly exercise a pull toward its point of attachment to the support 46; also there is an electric magnet 75 whose operation is activated by current passing in the connected relay circuit 35, the magnet 75 is attached to the support on the end thereof opposite from the spring attachment, and when activated by current passing through circuit 34, the electro-magnet 125 exercising a pulling effect against the magnetically sensitive section of the beam 73 opposite to it, and overcoming the spring, pulls the brake beam end down into contact with itself, and as a consequence of construction, when brake beam 73 is so pulled down to the magnet 125, the ratchets 76 and 77 are entirely out of the arc of the pathway of motion of cogs of cogwheel 47 (see Figure 26). When electro-magnet 125 is not activated by current passing through circuit 34 the pull of the spring 79 pulls down the end of the beam 73 to which it is attached until it is stopped by stop stud 88 on the pillar of the support 46 (see Figures 7 and 28), and in that position, the ratchets 76 and 77 on the beam 72 are within the pathway of movement of the cog teeth of cogwheel 47 and by their interference limit any movement of cogwheel 47 to not more than one half cog width distance of movement, until and unless, the ratchets 76 and 77 are caused to be withdrawn from contact by operation of the electro-magnet 75 as described.

*Gun sight adjusting means*

The type of gun sight illustrated herein for use with this invention is the ring type rear sight designated by the numeral 70, shown in Figs. 3, 11, 12 and 16, and the adjusting means illustrated are suitable for use with this type of sight. It is to be understood that this invention may be used to apply the overlead correction to other types of sights and that in such cases adjusting means adapted to the sight type used and responsive to the same control impulses transmitted from the overlead indicator, hereinbefore described, may be employed.

Figure 11:
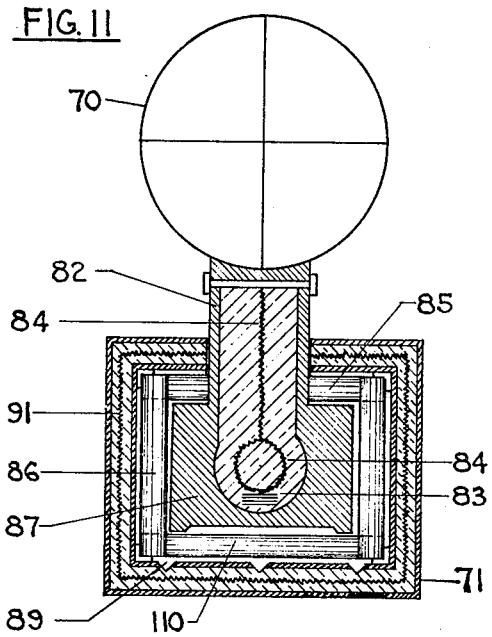
Figure 11 is a view partly in cross section of the rear gun sight taken on the line 11—11 of Figure 3.

The adjusting means herein illustrated comprise: a slide bar 87 to which the sight is attached by a supporting pillar 82 as shown in Figures 11 and 12. The pathway of movement of the slide bar 87 is parallel to the axis of the gun bore and is in a slot 41 in a compartment 71 of the housing hereinafter described as illustrated in Figs. 3, 11, 12, 13 and 17. To minimize friction any desired number of roller bearings may be placed in the slot to carry the slide bar, a sufficient set, designated by numerals 85, 86, 92, 110 and 111 is illustrated in Figs. 11, 12, 13 and 17.

Designated by the numeral 40 a scale indicative of amounts of overlead set off when the sight is opposite numbered scale points is marked on the top of housing compartment 71 alongside slot 41, numeral 0 of the scale is at the end thereof which is nearest the gun muzzle and the scale reads up to numeral 20 at the end thereof nearest the gun butt.

The prime mover of the adjusting means is a shunt wound reversible electric motor designated by the numeral 97 and represented in Figs. 12, 17 and 29, and is connected with and energized by circuit 34, hereinafter described.

The drive from the motor 97 to the sight carrying slide bar 87 is through a suitable continuation of shafts and gears in a continuation designated by the numeral 99, indicated in Figs. 12 and 17. It is to be understood that the arrangement of power of motor and ratios of gears provided is suitable to do the work involved.

The symbolic representation of the motor 97 in Figs. 12 and 17 does not show the motor shaft, but it is to be understood that on that shaft there is a gear which is the first of the gear continuation series 99 and that there is the usual drive connections on through the gear continuation 99, the transverse shaft 95, its gear 98, to the gear 94 on the bottom section of slide bar 87, whereby the drive effects propulsion of the slide bar 87 carrying the sight 70.

*Control elements within adjusting means*

Control of motor operation, consequently of set-off of overlead by movement of the sight, in response to the impulse initiated by the light intensity at the light sensitive means 1 and modified in the overlead indicator and transmitted through circuits 33 and 34 as hereinbefore described, is effected by control parts operationally connected with the circuits 33 and 34 and with one of the gear wheels of gear continuation 99, a gear wheel designated by the numeral 100 and called the motor brake wheel, shown in Figures 17, 20 and 29.

*Braking and unbraking of motor*

Normally, wheel 100 remains braked by the brake beam 101, which is pivoted by hinge 69 on a support 102. A spring 104 exerts a constant pull on one end, normally holding the other, a brake toothed end, in braking contact with the cogged perimeter of brake wheel 100, as illustrated in Figures 20 and 29. The brake toothed end of beam 101 is magnetically sensitive.

Electro-magnet 103 is adapted, and placed in position of such relation to brake beam 101, so that, whenever connected circuit 33 is opened through roller switch 65 at the overlead indicator face assembly as hereinbefore described, the electro-magnet 103 is energized, overcomes the pull of spring 104 and magnetically pulls to itself the magnetically sensitive brake toothed end of brake beam 101, whereby brake wheel 100, and the gear connected motor 97, are released from braking, as illustrated in Fig. 23.

Conversely, when circuit 33 is broken by roller switch 65 at the overlead indicator face assembly as hereinbefore described, magnet 103 is de-energized, and spring 104 effects a setting of brake beam 101 on wheel 100 as illustrated in Fig. 27.

*Opening and breaking of power circuit 34 of motor 97*

On one end of motor brake beam 101 opposite the brake toothed end, there is an operating rod or lug designated by the numeral 124 projecting into operational connection with a circuit breaking switch 123 set in the line of circuit 34, as illustrated in Figures 20 and 29. It is to be understood that the parts are so set that the described unbraking movement of brake beam 101 through rod 124 actuates operation of switch 123 to open the circuit 34 and energize the connected motor 97 as illustrated in Fig. 23; and conversely, the described braking movement of brake beam 101 through rod 124 actuates operation of switch 123 to break circuit 34 and de-energize motor 97, as illustrated in Fig. 27. Switch 123 is represented in the drawings by symbol, but its construction is to be understood as being that of any simple conventional rotary type of circuit breaking switch with an operating element adapted to actuation by the push of a passing lug or rod as above described.

*Elements limiting movement of cogwheel 100*

On brake beam 101 there are a pair of identical limiting ratchets, designated by numerals 116 and 117. They are hinged and held in normal position by spring and stop stud, see hinge designated by numeral 120, and spring designated by numeral 118, on ratchet 116, and stop stud 119 against ratchet 117, in Fig. 20. When brake beam 101 is normally set in engagement with brake wheel 100, in the position illustrated in Fig. 20, the ratchets are out of contact. When brake beam 101 is pulled out by electro-magnet 103 as hereinbefore described, the ratchets 116 and 117 are put into the contact position with cogs of wheel 100 (illustrated in Fig. 23), whereby they limit the movement of wheel 100 to 1 cog width distance, in either direction of movement of wheel 100.

*Circuit breaker switch 122 in relay circuit 35*

As shown in Fig. 20, there is on brake beam 101, near the end opposite from the braking tooth, an assembly for operating a circuit braking switch designated by the numeral 122 and set in the line of circuit 35, which connects with and energizes the electromagnet 75 which latter operates the limiting ratchet assembly of the overlead indicator face assembly hereinbefore described, and illustrated in Figs. 7 and 19.

The switch 122 is represented by symbol and its position in the line of circuit 35 is best illustrated in Fig. 29 but this Fig. 29 should be considered with Figs. 19 and 20. This switch is to be understood to be a common rotary type switch adapted for operation by the push of a lever or rod. Its operating rod designated by the numeral 121 is mounted upon a spring mounting designated by the numeral 129, as shown in Figs. 20 and 29, and normally stands out of contact with cogs of the adjacent wheel 100 and in a position perpendicular to inner edge of brake beam 101. It is to be understood that construction is such that when rod 121 stands in such normal position, held there by its spring mounting, that the connected rotary element of the switch is in such position that the leads are not in contact, and the circuit 35 is broken.

As illustrated in Fig. 23, when magnet 103 pulls beam 101 to itself, as hereinbefore described, that end of beam 101 which carries rod 121 and switch 122 swings in toward the wheel 100 by a distance which puts the upper end of rod 121 slightly within the pathway of movement of the cogs points of wheel 100, in a position approximately half way between the adjacent cog points, but out of contact with them, whereby contact of a cog with the rod begins when the hereinbefore described unit movement of cog wheel 101 by a distance of one cog width, is approximately one-half completed.

The push of a contacting cog causes rod 121 to swing on its hinged spring mounting 129, both ends describing an arc of movement, the upper end remaining in contact with the cog when cogwheel 100 completes its hereinbefore described unit movement, the lower end causing rotation of the attached rotary element of switch 122, whereby contacts are effected opening circuit 35 illustrated in Fig. 24, to thereby actuate the relay limiting ratchet assembly on the face assembly of the overlead indicator hereinbefore described and illustrated in Fig. 26. The consequent activation and completion of the unit operation of the overlead indicator face assembly and the breaking of circuit 33, as hereinbefore described, and as illustrated in Fig. 25, is affected whereby as a further consequence bar beam 100 is released by magnet 103 and re-sets itself in its normal position as hereinbefore described, and illustrated in Fig. 27 (note that as between Fig. 20 and Fig. 27 there is the difference that by reason of the described action the cogs of wheel 100 have changed position by one cog width in clockwise direction).

As hereinbefore stated, by reason of construction when brake beam 101 is in normal position, operating rod 121 is out of contact with cogs of wheel 100, whereupon the spring mounting 129 pulls rod 121 back into its normal position, wherein by virtue of the switch construction as before stated, the lead points are not in contact and circuit 35 is broken as illustrated in Fig. 27. This action causes return of the relay ratchets of the face assembly of the overlead indicator to their normal position, as hereinbefore described and as illustrated in Fig. 28.

*The set-off by the sight adjustment means*

It is to be understood that application of this invention to a gun sight does not interfere with the taking of normal aiming lead by the gunner, or relieve him of that responsibility. With a ring type sight as illustrated herein, the gunner takes normal aiming lead, setting it off in the usual way. In this taking of normal lead, the gunner so moves his gun that he views the apparent position of the transversely moving target plane along a line radially off-set from the center of the sight (therefore from the axis of the gun). The angle which the axis of the gun bore makes with the line of sight to the apparent position of the target is the normal lead angle, but for convenience the term "normal lead angle" is applied to the equal and homologous angle, the angle between the line eye through center of sight and the line of sight to apparent position of target. The aiming reflexes of the gunner have been fixed by training to set off this lead angle with effective approximation of accuracy and it should be noted that in relation to the use of this invention that its employment involves no change in procedure of the gunner, whereby liability of confusing his trained reflexes is avoided. His set-off of lead is by a radial distance from the center of the sight to the line of apparent sight which is the same whether or not this device has operated as hereinbefore described to move the sight through the slot 41 longitudinally of the gun bore, and closer to or further from the eyes of the gunner. The movement of the sight as hereinbefore described superimposes a correction in amount of lead varying in amount as the tangent of the lead angle varies in consequence of the change of distance from the eye to the center of the sight as appears from the following:

A right triangle is formed, by the line from the eye to the center of the sight which is perpendicular to the radial line from the center of the sight to intersection with the line of sight to the apparent position of the target and the hypotenuse is the portion of the line of sight intercepted by the radial line. In this right triangle the radial line is the leg opposite the lead angle and by hypothesis herein this opposite leg is a constant, but the adjacent leg, the line from eye to center of sight is varied by this invention's hereinbefore described movement of the sight along that line, therefore the lead angle tangent equals the $$\frac{\text{opposite leg}}{\text{adjacent leg}}$$

the lead is made greater as the adjacent leg is shortened by movement of the sight closer to the eyes, and is made less by movement further from the eyes.

Housings 71 and 72 and ancillary protective elements

The general construction of housing compartment designated by the numeral 71 may be seen in Fig. 12, a view partly in cross section taken on the line 12—12 of Fig. 3; in Fig. 13, a view partly in cross section taken on line 13—13 of Fig. 3 and in Fig. 17 a horizontal sectional view taken on the line 17—17 of Fig. 16. There is a double wall, with space filled with insulation material as indicated in Figure 17, except for space allowance for heat coil element 91, current to which is regulated by bi-metallic thermostat 108, both of which are served by circuit 32, whose line is shown in wiring diagram Fig. 29. By these and other devices described immediately following, the housing is temperature conditioned so that the interior and the bearing surface of the slot 41 in the top of the housing (see Fig. 3) may be kept ice free. The support 82 of the sight passes through slot 41. Due to extraordinary weather conditions met with by devices exposed on aircraft, special protective measures must be taken because some ice and water will be forced through slot 41. The described means will convert the ice into water and a water disposal system will dispose of the water. The water disposal system is a three pronged water vent channel designated by the numeral 89 illustrated in Figs. 11 and 17, which conduct water from the bottom of the compartment 71 into the entrance of the drain pipe 90, Figs. 13 and 17. The water pipe 90 passes through the adjoining compartment walls into compartment 72 described hereinafter, and down through the bottom wall of compartment 72 to discharge into the outer air, Fig. 12. Pipe 90 is itself double walled, insulated and provided with a heat coil element 106 which is regulated by thermostat 105, both connected with circuit 32, Figs. 15 and 29.

As is illustrated in Figs. 12 and 17, housing compartment 72 is of the same general construction as compartment 71, as it has no ungasketed opening like sight slot 41 it needs no water drainage system. A hydroscopic cartridge 113 seen in Fig. 17 takes care of atmospheric moisture.

Protection of sight support 82 and slide bar 87

An accordion type conductor 109, Figs. 13 and 17 carries the line of circuit 32 to slide bar 87, where it energizes the bi-metallic thermostat 83 which regulates the heat coil 84, Figs. 11 and 12. These elements, by heating both the slide bar 87 and sight support 82 from the inside, give protection against sticking by icing.

Electrical connections

A suitable arrangement of electrical connections for the device illustrated is shown diagrammatically in Fig. 29.

From that figure it will be observed that six circuits extend to the elements requiring electric energization, each circuit from a terminal for connection with an appropriate power source.

The circuits and the elements respectively set in them are:

Circuit designated by the numeral 2 connects from its power terminal to light sensitive element 1 to ammeter 50 of the light intensity indicator.

Circuit 31 connects from the power terminal to a series of current varying elements, variable resistors 61, set within the circuit to ammeter 51 of the face assembly of the overlead indicator.

Circuit 32 extends from its power source terminal to a series of pairs of elements, each pair consisting of a thermostat and the heating coil which it regulates, designated respectively by numerals: 114 and 112; 105 and 106; 108 and 91; 83 and 84; 53 and 54, in the gun sight adjusting means, and the circuit further extends to a light 52 in the face assembly of the overlead indicator.

Circuit 33 extends from its power source terminal connection through a series of circuit breaker sections and switch roller 65 in the face assembly of the overlead indicator face assembly, through an electro-magnet 125 of the ratchet brake assembly upon the pointer 57 of the light intensity indicator, and on through an electro-magnet 103 at the gun sight adjusting means.

Circuit 34 extends from its power source connection terminal to a circuit breaking switch 123 at the gunsight adjusting means to the motor, and a side lead goes from the switch 123 to a motor reversing switch 45 at the face assembly of the overlead indicator and back to the motor field as illustrated in Fig. 29.

Circuit 35 extends from its power source terminal connection to circuit breaker switch 122 at the gun sight adjusting means to electro-magnet 75 of the relay limiting ratchet sub-assembly at the face assembly of the overlead indicator.

Operation

The operation of the apparatus has been explained in connection with the foregoing description of parts, and in a general way, under the heading of "General description," a sufficient review is made in the following statement of what happens during service upon the occasion of a change in light intensity which makes the set-off of an additional amount of overlead appropriate for correction of the effect upon aiming of the light intensity to which the light changes.

For this illustration it is understood that the instrument has previously been adjusted to the optical reactions of the gunner by the procedures hereinbefore described under the headings of the "Correlation assembly" and the "Setting of the instrument."

It is further understood that for this particular gunner's reactions it has previously been determined by said procedures that a set-off of amount of overlead effected by placing the sight 70 at point "10" on the sight scale of overlead 42 is appropriate for a light condition within the range of light intensities relevant to overlead and indicated by position of the pointer 57 of the light intensity indicator at point "12" on the scale 80 of inverse light intensities (the scale 42 is illustrated in Fig. 3 and the scale 80 in Fig. 5). Similarly overlead set-off "11" is appropriate for light intensity "13."

It is further to be understood that for purposes of illustration that the light intensity "12" is affecting the eyes of the gunner the light sensitive element 1, whereby the pointer 57 of light indicator is caused to stand at point "12" on its scale 80.

Such position of pointer 57 implies that in process of arriving at the point 12 from its position during normal light, namely, point "0," the pointer 57 has previously and successively pushed over the operating rods of, and caused the operation of, those members of the series 61 of variable resistors designated by the numerals 1 to 10, inclusive, which are located in the pathway of pointer 57 between point "0" and point "12."

From the description hereinbefore it is understood that operation of a variable resistor by the push of the pointer 57 as it moves in the direction up its scale of inverse light intensities 80, is an operation of decrease of resistance, therefore of increase of current, in the circuit 31 within which the resistors are set, whereby that current is made an aggregate in amount of normal amount plus the ten unit increments consequent to the ten unit decreases of resistance, whereby the connected ammeter 51, energized by that current, places its pointer 48 at the point on its scale indicative of that aggregate amount of current, point "10" on its scale 68 as that scale is arranged, whereby the controls activated by the movement of pointer 48, and attached cogwheel 47, caused the gun sight adjusting assembly to place the sight 70 at corresponding point "10" on its scale 42.

Each point by point step from the "0" points of scale in the system to the points corresponding to set-off of overlead "10" by the sight was by a similar step process, which severally were the same in nature of operation as will be described for the next step, from point "10" to point "11," of overlead taken as determined to be appropriate for that gunner when his eyes are affected by light intensity "13."

Before further tracing the sequence of action in the operation it is helpful to refer to the whole group of Figures 18 to 28 inclusive which illustrate most of the control interaction.

Figures 18, 21 and 25 are views of the same segment of the arc of the circuit breaking switch section in the line of circuit 33 over which pointer 48 and the attached switch roller 65 moves, and of the outer end of that pointer 48 and the attached switch roller 65 as taken along the line 18 in elevation of the overlead face assembly in Fig. 7, presenting different positions of parts.

Figures 19, 22, 26 and 28 are views of the relay limiting ratchet sub-assembly and segments of the contacting cogwheel 47 taken along the line 19 in Fig. 7, presenting views of four different positions of the parts.

Figures 20, 23, 24 and 27 are elevation views of motor brake wheel 100, contacting brake beam 101, its attached sub-assemblies and electromagnet 103, an assembly whose position in the motor gear continuation of the gun sight adjusting means is indicated by the line 20 in Figure 17 (wherein the assembly is shown in edgewise view).

Fig. 18 shows the pointer 48 and attached switch roller 65 at point 10 of the scale 68 of the face assembly of the overlead indicator, as of the time of commencement of this illustrated action. It will be noted that one end of the switch roller 65 is on an insulated section of the line of circuit 33, whereby circuit 33 is broken in consequence of which electromagnet 103 is de-energized, and spring 104 holds brake beam 101 set upon brake wheel 100 as illustrated in Fig. 20. Fig. 19 shows the corresponding position of the relay limiting ratchet sub-assembly in its normal position of readiness, and it will be noted that the ratchets 76 and 77 are placed to catch, and hold, any cog of wheel 47 upon movement of that wheel by one half cog width.

For illustration, with pre-existing set-up as described, take the case of light intensity changing from the described "12" to intensity "13."

The change of light activates the light sensitive element 1 to initiate operation of the apparatus by causing the pointer 57 to move as hereinbefore described up its inverse light intensity scale 80 to point "13" thereupon. In so doing the pointer operates the variable resistor designated by the numeral "11." Whereupon the increment of current in circuit 31 respective to the operation of that resistor 11 in the series 61 causes pointer 48 of the connected ammeter 51 to start its movement to the point "11" on its scale, which is the position predetermined to be respective to the amount of current, but its movement is halted by the relay limiting ratchets as illustrated in Fig. 21.

It will now be noted that pointer 48 is halted midway between scale points with both ends of switch roller 65 on conducting surface of line of circuit 33, whereby that circuit is opened, and whereby electro-magnet 103 is energized and pulls the brake end of brake beam 101 in toward itself releasing motor brake wheel 100 and allowing the motor 97, the gear and the connected sight freedom of movement. With the same motion the rod 124 projecting from brake beam 101 operates switch 123, opening circuit 34, whereby the motor is energized.

And it is to be understood that in the initial half-way movement of cogwheel 47 described above, a cog of that wheel operated motor reversing switch 45, also set in circuit 34, assuring that direction of action of motor 97 corresponds with the action of pointer 48 attached to cogwheel, as described hereinbefore under the heading "Motor reversing switch 45."

It will be also understood that upon the opening of circuit 33 as aforesaid the electro-magnet 125 is energized and sets brake 74 holding pointer 57 of the light intensity indicator as hereinbefore described.

After but a short time lag, the motor energized by the opening of circuit 34 by switch 123, as above described, "kicks" and motor brake wheel 101 starts moving, but it is limited to one cog width distance of movement, being caught by a limiting ratchet of the pair 116 and 117, as illustrated in Fig. 24.

As wheel 100 moves, a cog thereof contacts rod 121 and upon completion of the cog width movement, the cog holds rod 121 in position wherein the rod operates switch 122 to open relay circuit 35, whereupon electro-magnet 75 of the relay limiting ratchet sub-assembly of the overlead indicator face assembly is energized and pulls the ratchets out releasing cogwheel 47, as illustrated in Fig. 26, whereupon attached pointer 48 and switch roller 65 are also released and proceed to complete the movement for which they are energized by the amount of current passing through circuit 31 as hereinbefore described, namely, the movement of pointer 48 and switch roller 65 to point "11" as illustrated in Fig. 25. It will be noted that all the point "11," as at all points, one end of the switch roller 65 is on an insulated section of the line of circuit 33, whereby the circuit is broken, electro-magnet 103 is de-energized and spring 104 pulls brake beam 101 back into normal braking position against brake wheel 100, holding that wheel, the motor and the gear connected sight at position constituting overlead position "11." This is the set-off of overlead appropriate for light intensity "13," the light intensity whose activation is maintained during this described action of the motor assembly by the holding of pointer 57 by the brake 74 as controlled as hereinbefore described by the energization of circuit 33.

The system is made ready for the next step by the pulling out of the end of the brake beam 101 to which operating rod 121 is attached, whereupon the spring mounting 129 of rod 121 pulls the rod back into normal position wherein it holds switch 122 in the position breaking circuit 35. This causes electro-magnet 75 to be de-energized and spring 79 pulls the relay limiting ratchets back into their normal ready position at the face assembly of the overlead indicator, as illustrated in Figure 28, and hereinbefore described.

It is also to be understood that upon the breaking of circuit 33 the electro-magnet 125 was de-energized and spring 126 pulls ratchet 74 out of contact with ratchet track 59 releasing pointer 57, freeing the light intensity indicator assembly for appropriate reaction to such further impulses to it from light sensitive element 1 through circuit 2 as may be initiated by further changes of light intensity.

Conversely, variation of light to greater intensities, similarly initiates similar action, in reverse.

It is to be understood that the mechanism shown and described herein are for illustrative purposes only and not to be used in a limiting sense. I desire to comprehend within my invention all modifications within the limits of the appended claims.

I claim:
1. In a device for automatically controlling overlead in a gun sight the combination of, a light sensitive element, means for translating electrical energy into mechanical movement in proportion to the amount of electrical energy delivered to said means by said element, first circuit means for connecting said light sensitive element to said translating means, and means including adjustable means forming part of said translating means, gun sight adjusting means and a second circuit means connected to said adjusting means and translating means whereby said gun sight is automatically adjusted to vary the angular relation between the gun axis and the apparent line of sight to the target according to light changes affecting said light sensitive means.

2. In a device for automatically controlling overlead in a gun sight the combination of, a light sensitive element, adjustable means for translating electrical current into mechanical movement, circuit means connecting said adjustable means to said light sensitive element for adjusting said means proportional to the intensity of light ambient on said element, said adjustable means including variable resistor means, means for adjusting said gun sight and means connecting said variable resistor means to said gun sight including a second circuit means, whereby said gun sight is automatically adjusted to vary the angular relation between the gun axis and the apparent line of sight to the target.

3. In a device for automatically controlling overlead in a gun sight the combination of, light sensitive means, overlead indicator means and gun sight movement assembly means including means for driving said gun sight, electric means including a circuit connected with said light sensitive means for causing operation of said overlead indicator means in accordance with light intensity affecting said light sensitive means, whereby said gun sight is automatically adjusted to vary the angular relation between the gun axis and the apparent line of sight to the target, and electrical means connecting to the overlead indicator means for preventing said overlead indicator means from running ahead of said gun sight driving means.

4. In a device for automatically controlling overlead in a gun sight the combination of, light sensitive means, overlead indicator means and gun sight movement assembly means including means for driving said gun sight, electric means including a circuit for causing operation of said overlead indicator means in accordance with light intensity affecting said light sensitive means, whereby said gun sight is automatically adjusted to vary the angular relation between the gun axis and the apparent line of sight to the target, a relay circuit connected to said gun sight movement assembly means, relay control ratchet means connected to said relay circuit and attached to said overlead indicator means for preventing said overlead indicator means from running ahead of said gun sight driving means, and a second control ratchet means for preventing said gun sight driving means from running ahead of said overlead indicator means.

5. In a device for automatically controlling overlead in a gun sight the combination of, light sensitive means, overlead indicator means and gun sight movement assembly means including means for driving said gun sight in synchronism with the movement of said indicator means, electric means including a circuit for causing operation of said overlead indicator means in accordance with light intensity affecting said light sensitive means, whereby said gun sight is automatically adjusted to vary the angular relation between the gun axis and the apparent line of sight to the target and limiting ratchet means connected to said gun sight movement assembly means whereby said gun assembly means is prevented from moving out of synchronism with said overlead indicator means, and said overlead indicator means is energized by and in synchronism with the operation of said variable resistance means.

6. In a device for automatically controlling overlead in a gun sight the combination of, light sensitive means, overlead indicator means, and a gun sight moving means, said overlead indicator means including a pivoted arm and adjustable variable resistor means actuated by and in sequence with the movement of said arm, and circuit means connecting said light sensitive means and said overlead indicator means to move said arm, and additional circuit means for connecting said resistor means and said gun sight moving means, whereby said gun sight is automatically adjusted to vary the angular relation between the gun axis and the apparent line of sight to the target.

7. In a device for automatically controlling overlead in a gun sight including light sensitive means comprising a photoelectric cell, overlead indicator means, movable by and in response to current variations in said photoelectric cell, circuit means connecting said photoelectric cell and said overlead indicator means, whereby said gun sight is automatically adjusted to vary the angular relation between the gun axis and the apparent line of sight to the target, said overlead indicator means including an arm movable in accordance with current variations in said photoelectric cell and further including an adjustable variable resistance means, and circuit means connecting said variable resistance means, and said overlead indicator means is energized by and in synchronism with the operation of said variable resistance means.

8. In a device for automatically controlling overlead in a gun sight including light sensitive means comprising a photoelectric cell, overlead indicator means, movable by and in response to current variations in said photoelectric cell, circuit means connecting said photoelectric cell and said overlead indicator means, whereby said gun sight is automatically adjusted to vary the angular relation between the gun axis and the apparent line of sight to the target, said overlead indicator means including an arm movable by and in accordance with current variations in said photoelectric cell and further including a variable resistance means, said variable resistance means including a plurality of adjustable switch arms adapted for adjustment for calibration purposes, said arms being adapted to be tripped by said movable arm, and circuit means connected to said variable resistance means.

9. In a device for automatically controlling overlead in a gun sight including light sensitive means comprising a photoelectric cell, overlead indicator means, movable by and in response to current variations in said photoelectric cell, circuit means connecting said photoelectric cell and said overlead indicator means, whereby said gun sight is automatically adjusted to vary the angular relation between the gun axis and the apparent line of sight to the target, said overlead indicator means including an arm movable in accordance with current variations in said photoelectric cell and further including a variable resistance means, said variable resistance means including a plurality of manually adjustable switch arms, each of said arms being mounted on a respective spring clip, and circuit means connected to said variable resistance means.

10. In a device for the automatic application to an adjustable gun sight of the determination of the overlead correction appropriate to an aiming made with that gun sight, the combination of gun sight adjusting means; a light sensitive element; ammeter means including an element movable by and in proportion to amount of electrical energy delivered to said ammeter means; first circuit means for connecting said light sensitive means to said ammeter means, a second circuit means, adjustable means in said second circuit for varying the amount of current passing through said second circuit, said adjustable means being operated by the said movable element of said ammeter means during movement thereof, said second circuit means connecting with said gun sight adjusting means whereby said gun sight is automatically adjusted to vary the angular relation between the gun axis and the apparent line of sight to the target as a function of light intensity affecting said light sensitive means.

11. In a device for the automatic application to an adjustable gun sight of the overlead correction made necessary by variation in intensity of ambient light, the combination of gun sight adjusting means; photo-electric cell means; ammeter means including an element movable in proportion to amount of electric energy delivered to said ammeter means; first circuit means for connecting said photo-electric means to said ammeter means; a second circuit means; adjustable means in said second circuit for varying the amount of current in said second circuit means, said adjustable means being operated by the said movable element of said ammeter means during the movement thereof and said second circuit means connecting with said gun sight adjusting means whereby said gun sight is automatically adjusted to vary the angular relation between the gun axis and the apparent line of sight to the target of said aiming as a function of the light intensity affecting the said photo-electric means modified by the predetermined adjustment of said current varying means set in said second circuit.

12. In a gun sighting system which involves in its use vision by the eyes of the gunner, and includes a gun and a gun sight adjusting means adapted to effect angular variance of the relation between the axis of the gun bore and the apparent line of sight to a target moving transversely to said line of sight as a function of that component of the motion of the target which is transverse to the line of sight, and including means which modify the actuation of said angular variance as a function of the current received by it through circuit means; the combination of light sensitive means exposed to the light of approximately the same intensity as simultaneously affects the eyes of the gunner; means for translating electrical energy into mechanical movement of a movable member; first circuit means for connecting said light sensitive element and said translating means, whereby the said movement of said movable member is a function of light intensity; second circuit means; adjustable means for varying the amount of current in said second circuit means, said adjustable means being operated by the said movable member of the said translating means during the movement thereof, and second circuit means connecting with said modifying means of the gun sight adjusting means, whereby modifications of said angular variation are effected, by adaptation of the said adjustable means the said variation of current and consequent modification of said angular variance are a function of the predetermined optical reactions of the said gunner to light intensities, whereby the angular variation of the axis of the gun bore to the apparent line of sight to the moving target is a co-function of: the movement of that target transverse to said line, the light intensity affecting the eyes of the gunner and of the optical reaction of the eyes of the gunner to that light intensity affecting them.

MARCUS LIPSCOMB MOREMEN.